E. BUGATTI.
RESILIENT RADIUS ROD.
APPLICATION FILED AUG. 26, 1913.

1,181,731.

Patented May 2, 1916.

Witnesses
D. F. Schilling
Hermann Henock

Inventor
Ettore Bugatti
by Paul D. Schilling
his attorney

UNITED STATES PATENT OFFICE.

ETTORE BUGATTI, OF MOLSHEIM, GERMANY.

RESILIENT RADIUS-ROD.

1,181,731. Specification of Letters Patent. Patented May 2, 1916.

Application filed August 26, 1913. Serial No. 786,811.

*To all whom it may concern:*

Be it known that I, ETTORE BUGATTI, a subject of the King of Italy, and residing at Molsheim, Alsace, Germany, have invented certain new and useful Improvements in Resilient Radius-Rods, of which the following is a specification.

The present invention has reference to improvements in rods for supporting vehicle axles, and relates more specifically to a rod for resiliently connecting the front axle of vehicles, and more particularly of automobiles, to the frame in such manner that it allows of resiliency in up-and-down and also lateral direction.

In automobiles with transverse supporting springs it is customary to guard the front axle against canting by means of two supporting rods, which connect the front axle to the longitudinal frame bearers and which can swing, to a certain extent, in a vertical plane. These rods, however, must admit of vertical as well as of horizontal movement of the axle, and they consequently very soon show wear at the joints, which is unpleasantly evidenced by rattling. According to the present invention this drawback is effectively done away with by securing the rods rigidly to the frame and to the axle, and by providing them with a flattened portion and then twisting this latter, whereby the requisite two-fold flexibility is obtained.

In order to make my invention more readily understood, I will now describe it with reference to the accompanying drawing, in which—

Figure 1:
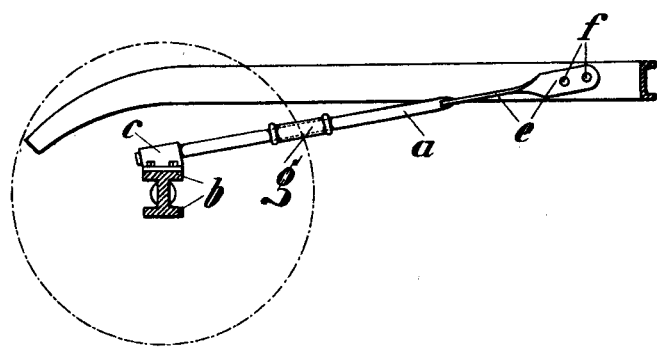
Figure 2:
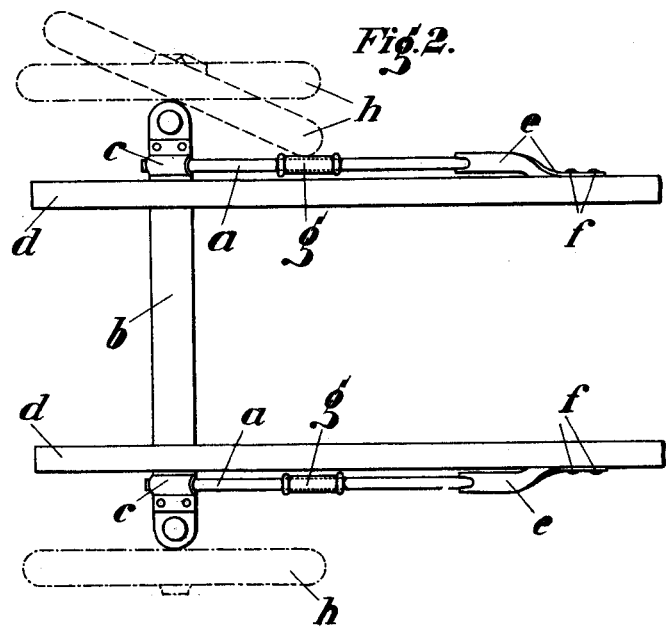

Figure 1 represents a side elevation of the arrangement, with the front axle in section, and Fig. 2 a plan thereof.

The rods $a$, serving to prevent tilting of the leading axle $b$ of the vehicle, are rigidly secured at their front ends to the shoes $c$, fixed on the axle $b$. The rear portion $e$ of the rod is flattened and axially twisted at an angle of about 90°, and is rigidly secured to the longitudinal frame member $d$, for instance by screws or rivets $f$. The heavy portion of the rod, obviously, may be made in one with the flattened and twisted portion $e$, or the part $a$ may be suitably secured to a flattened and twisted part $e$, and it is this latter construction that is shown in the drawing.

By reason of the twisted portion of the support-rods, the latter shows resiliency both in vertical and horizontal direction.

Sleeves $g$ may be rotatably mounted on the shafts $a$, with which the wheels $h$, upon excessive steering movement, will contact, when these sleeves will rotate and thereby prevent tire wear.

What I claim is:—

In an automobile in combination with the vehicle frame and the front wheel axle, the hereinbefore-described radius rod comprising a straight inelastic portion rigidly secured to said axle, and a flat elastic portion twisted once at an angle of 90°, contiguous to said inelastic portion and rigidly secured to said frame in such manner as to allow of said frame and said axle being displaced relative to one another both in vertical and in horizontal planes without any relative movement between the ends of said radius rod and said frame and axle respectively.

In testimony whereof I affix my signature in presence of two witnesses.

ETTORE BUGATTI.

Witnesses:
MILO A. JEWETT,
JOSEPH ROHMER.